(12) United States Patent
Fornell et al.

(10) Patent No.: US 7,410,207 B2
(45) Date of Patent: Aug. 12, 2008

(54) ARRANGEMENT IN CONNECTION WITH A VEHICLE CAB

(75) Inventors: Magnus Fornell, Eskilstuna (SE); Jonny Lindblom, Eskilstuna (SE)

(73) Assignee: Volvo Construction Equipment, Eskilstuna (SE)

( * ) Notice: Subject to any disclaimer, the term of this patent is extended or adjusted under 35 U.S.C. 154(b) by 0 days.

(21) Appl. No.: 11/307,851

(22) Filed: Feb. 24, 2006

(65) Prior Publication Data

US 2006/0125287 A1 Jun. 15, 2006

Related U.S. Application Data

(63) Continuation of application No. PCT/SE2004/001222, filed on Aug. 20, 2004, now abandoned.

(30) Foreign Application Priority Data

Aug. 25, 2003 (SE) .................................. 0302290

(51) Int. Cl.
*B60J 7/00* (2006.01)

(52) U.S. Cl. .............................. 296/190.03; 296/190.07
(58) Field of Classification Search ................................
296/190.03–190.07, 190.01, 190.08
See application file for complete search history.

(56) References Cited

U.S. PATENT DOCUMENTS

| 4,515,234 | A | 5/1985 | Loy et al. |
| 5,150,942 | A | 9/1992 | Fujan et al. |
| 5,547,244 | A * | 8/1996 | Lee ............................ 296/102 |
| 6,149,228 | A | 11/2000 | O'Neal et al. |
| 6,427,795 | B1 * | 8/2002 | Johnson et al. .......... 180/89.14 |
| 7,029,059 | B2 * | 4/2006 | Bernhardt et al. ...... 296/190.07 |

* cited by examiner

*Primary Examiner*—Joseph D Pape
(74) *Attorney, Agent, or Firm*—Novak Druce + Quigg LLP

(57) ABSTRACT

An arrangement for incorporation into a vehicle cab that includes a cab structure (2) that delimits a driver's working area. The arrangement has a support structure (3) arranged to support the cab structure (2) in the event of a considerable inclination of the cab structure relative to the frame (4) of the vehicle.

38 Claims, 3 Drawing Sheets

ARRANGEMENT IN CONNECTION WITH A VEHICLE CAB

CROSS-REFERENCE TO RELATED APPLICATIONS

The present application is a continuation patent application of International Application No. PCT/SE2004/001222 filed 20 Aug. 2004 which was published in English pursuant to Article 21(2) of the Patent Cooperation Treaty, and which claims priority to Swedish Application No. 0302290-2 filed 25 Aug. 2003. Said applications are expressly incorporated herein by reference in their entireties.

FIELD OF THE INVENTION

The present invention relates to an arrangement in a vehicle cab, which arrangement comprises a cab structure that delimits a driver's working area. The invention is primarily intended for use with a working vehicle such as a construction vehicle, for example in the form of the wheeled loader or dumper (articulated lorry). The invention is therefore described below for a wheeled loader. However, this is not to be regarded as limiting the field of application of the invention.

BACKGROUND OF THE INVENTION

A wheeled loader is often utilized in terrain with very uneven surfaces which give rise to strong vibrations and shocks. In order to make the driver's working environment comfortable, the cab must be suspended in such a way that the vibrations and shocks are reduced or eliminated and are thus not transferred directly from the frame of the vehicle to the cab. For reasons of safety, the cab must, in addition, must be sufficiently strong to provide the driver with a personal survival space if the vehicle should roll over onto the cab. In this connection, ROPS requirements are often mentioned, with the acronym ROPS standing for Roll Over Protection Structure. The ROPS requirement depends upon the vehicle's weight; that is to say, a heavier machine requires a more substantial and therefore often heavier cab.

SUMMARY OF THE INVENTION

An object of the invention is to achieve an arrangement in connection with a vehicle cab that provides an overall weight reduction in comparison to previously known technology, and to provide a design that is sufficiently stable to meet the ROPS requirement.

This object is achieved by means of an arrangement comprising (including, but not necessarily limited to) a support structure arranged to support the cab structure in the case of being inclined considerably relative to the horizontal plane (a probable roll condition) and in the event that an inclination of the cab structure relative to the frame of the vehicle is caused. The support structure is thus arranged to provide a transmission of forces to the cab structure in the event of a specific inclination or canting of the cab being exceeded. The specific inclination corresponds suitably to the driver experiencing the inclination as unpleasant and/or feels there is a danger that the vehicle will tip over.

In addition, by utilizing a support structure, a modular cab system can be created. In this way it is possible for a specific cab structure to be utilized for several types or models of vehicle having different weights, but in which the support structure is varied to make accommodation.

According to a preferred embodiment, the cab structure and the support structure are arranged in such a way that they essentially do not affect each other in a force-transmitting way when the inclination of the cab structure relative to the horizontal plane is less than said inclination, and the cab structure and the support structure are arranged to be connected in a force-transmitting way when the inclination of the cab structure relative to the horizontal plane exceeds said inclination. The cab structure can thus essentially move freely relative to the support structure in the event of only a small inclination of the cab structure relative to the support structure.

According to a second preferred embodiment, the support structure extends to a considerably lower height than the height of the cab structure, for example to a height that is approximately fifty percent of the height of the cab structure. By means of a suitable design of the support structure, the driver's view is not affected in the direction, normally backwards, where the support structure is located.

According to another preferred embodiment, the arrangement comprises means for connecting the cab structure to the support structure in such a way that the support structure supports the cab structure in the event of excessive inclination of the cab relative to the horizontal plane. More specifically, the connecting means is arranged, in an active mode, to provide a force-transmitting connection between the cab structure and the support structure and, in an inactive mode, to provide the cab structure with essentially free movement without the transmission of forces from the support structure. By this means, the cab's normal shock-absorbing system can function as normal during normal driving; that is to say, the connecting means is here in inactive mode. In event of a greater inclination or canting of the cab, however, the support structure provides the intended support; that is to say, the connecting means is in active mode.

Other advantageous embodiments of the invention and its associated advantages are apparent from the other patent claims and from the following description.

BRIEF DESCRIPTION OF THE DRAWINGS

The invention will be described in greater detail in the following, with reference to the embodiments shown in the attached drawings, in which.

DETAILED DESCRIPTION

Figure 1:
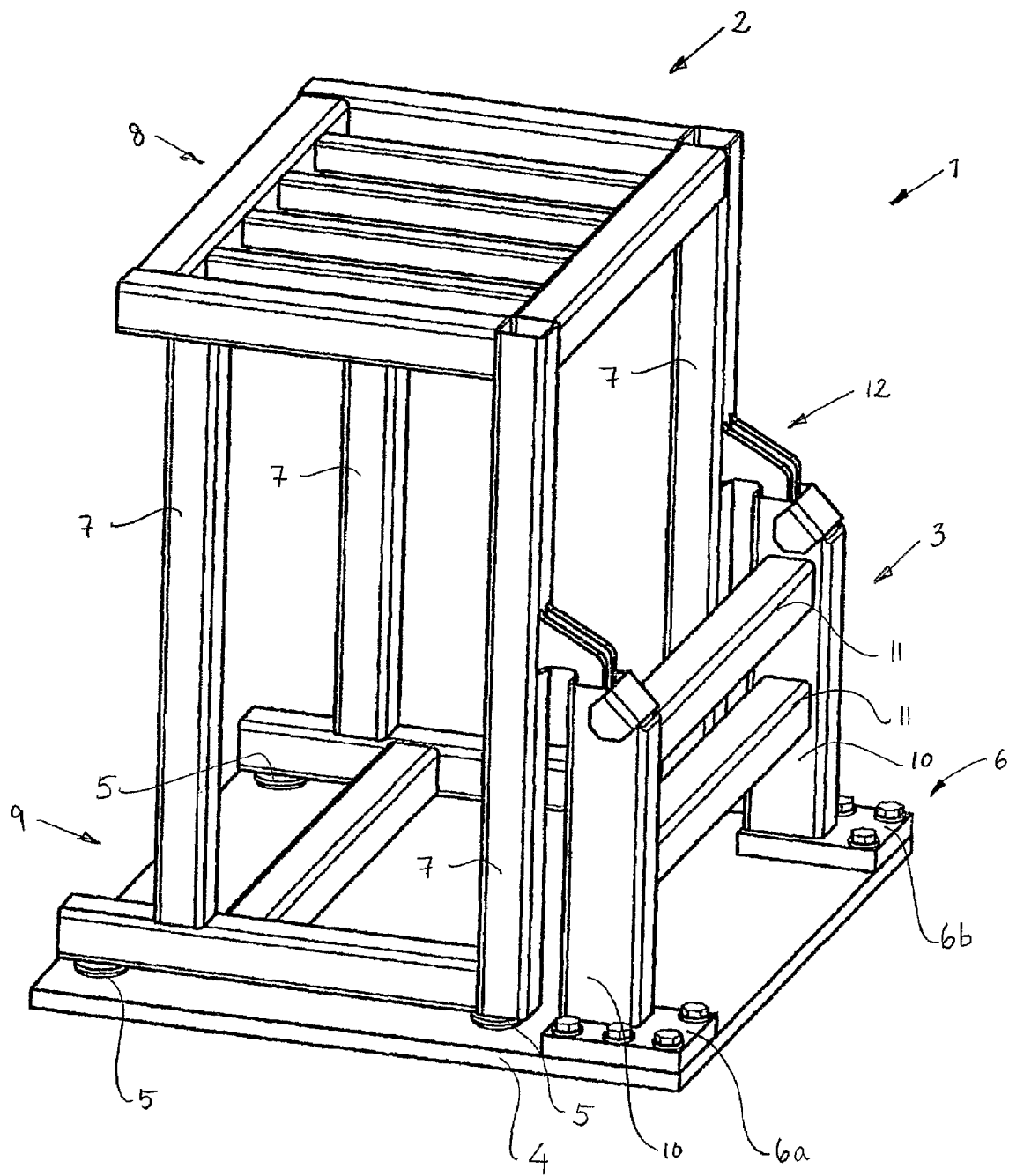
FIG. 1 is a back perspective view of a first embodiment of an arrangement configured according to the teachings of the present invention.

FIG. 1 shows a perspective view from the back of an arrangement 1 in connection with a cab of a working vehicle in the form of a wheeled loader. The arrangement comprises a cab structure 2 that delimits a driver's working area and a support structure 3 that is arranged to support the cab structure 2 in the event of a considerable inclination of the cab relative to the horizontal plane and in the event of an inclination of the cab structure 2 in relation to the frame of the vehicle, here illustrated by a bottom plate 4. The support structure 3 thus absorbs forces and, in conjunction with the cab structure 2, forms a sufficiently strong construction to fulfill the ROPS requirement.

The cab structure 2 is constructed of a plurality of long construction elements, exemplified as girders, and that are joined in such a way that together they form a rectangular box shape. In other words, the cab structure 2 is in the shape of a perpendicular block or box. More specifically, four vertical long construction elements 7 are arranged in such a way that they delimit the corners of the perpendicular block. Additional long construction elements delimit a horizontal upper plane 8 and lower plane 9. The cab structure 2 comprises, in addition, elements 5 for damping shocks, noise and the like from the frame 4 of the vehicle. The damping elements 5 consist of rubber insulators that are arranged at the floor level of the cab structure 2, below the lower plane 9.

The support structure 3 is arranged at a distance from the cab structure which is behind. The support structure 3 is constructed of a plurality of long construction elements (girders) that are joined together in such a way that together they form a frame or an arch. Two vertical long construction elements 10 define the side edges of the support structure. Two horizontal long construction elements 11 are arranged between the vertical construction elements and connect these together. The support structure 3 extends in a plane parallel to the back of the cab structure 2. The support structure 3 additionally comprises means 6 for connecting it securely to the frame 4 of the vehicle. The connecting means 6 comprises two spaced apart connecting devices 6a, 6b, each of which comprises a bolt connection.

The arrangement 1 comprises, in addition, means 12 for connecting the cab structure 2 to the support structure 3 in such a way that the support structure absorbs the lateral forces that act on the cab structure when the vehicle is in use and that exceed the lateral forces with which the shock-absorbing system 5 can cope.

In an active mode, the connecting means 12 is arranged to provide a force-transmitting connection between the cab structure 2 and the support structure 3. By active mode, it is meant that the vehicle is driven in such a way that a certain inclination or canting of the cab structure is exceeded. In an inactive mode, the connecting means 12 is arranged to afford the cab structure 2 essentially free movement without the transmission of forces from the support structure 3. Inactive mode is thus utilized to describe a normal mode of vehicle operation in which the vehicle is not exceeding any inclination limits or otherwise excessively canted or tilted from horizontal.

The connecting means 12 thus forms a type of connecting arrangement that permits a certain movement of the cab structure 2 relative to the support structure 3 before the structures are connected together. In the "connected together" mode or state, however, they work as a single unit.

The connecting means 12 comprises two male elements 12a in the form of claw-shaped elements (See FIG. 2) that project downwards from the back of the cab structure 2. The claws 12a are attached to the cab structure 2 by a welded connection (not shown). The connecting means 12 additionally comprises a female element 12b in the form of an opening 12b in the support structure 3 which is open at the top. More specifically, the opening 12b is formed in the top of each of the long vertical construction elements 10 due to the fact that they are hollow. The connecting means 12 is therefore arranged on an upper part of the support structure 3.

When mounting the arrangement on the frame 4 of the vehicle, the support structure 3 is suitably first attached to the frame and then the cab structure 2 is lowered from above into its intended position. The claws 12a are then received into the openings 12b in the support structure 3.

The support structure 3 extends to an essentially lower height than the height of the cab structure 2 in a vertical direction. More specifically, the support structure 3 extends to a height that is less than seventy-five percent of the height of the cab structure 2, and suitably to a height that is approximately fifty percent of the height of the cab structure. In this context, "height" is used to describe the extent in a vertical direction when the vehicle is in its normal position, that is to say when it is standing on a flat surface.

Figure 2:
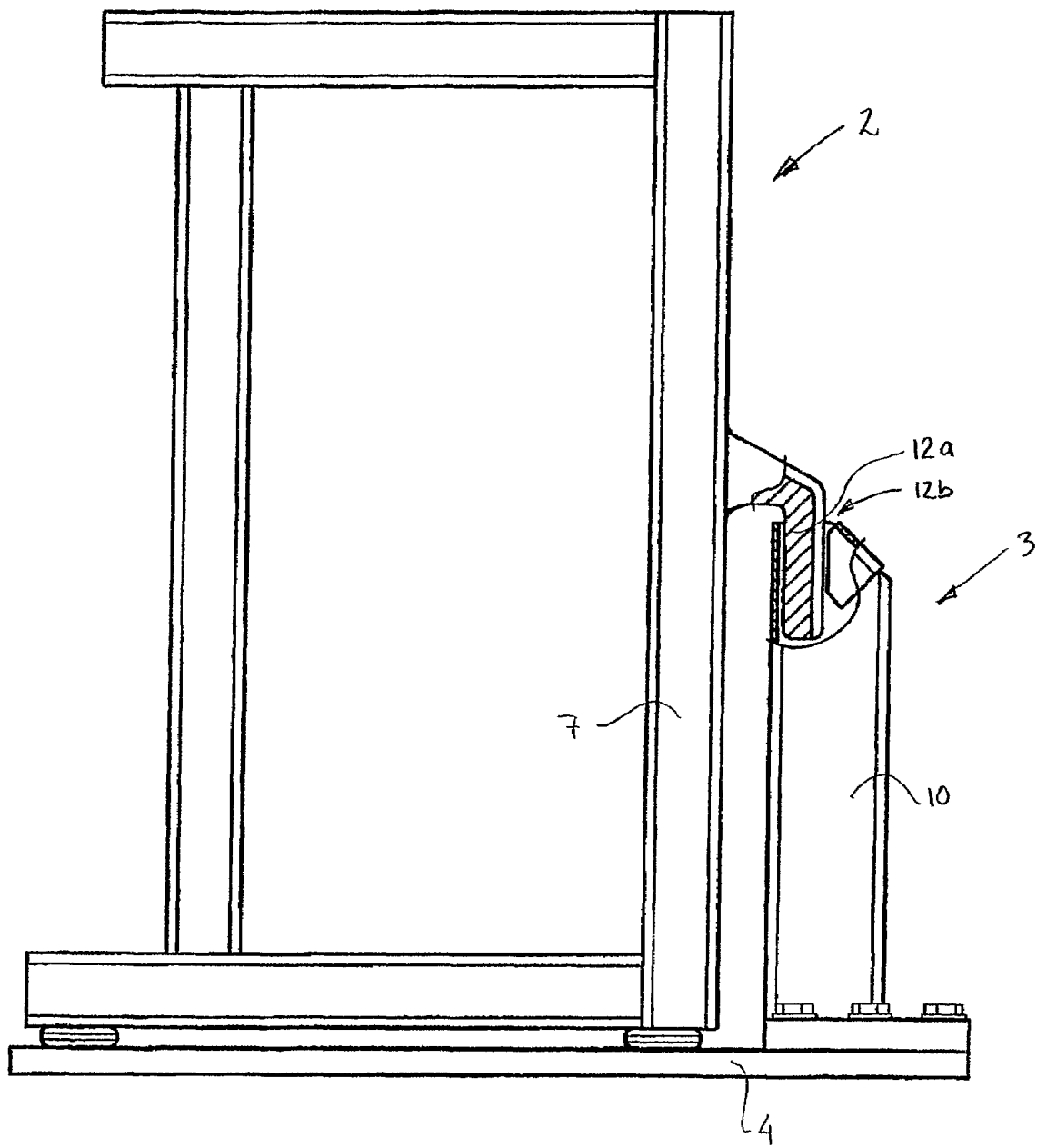
FIG. 2 is a side elevational view, shown in partial cutaway, of the arrangement of FIG. 1.

In the description above in connection with FIG. 2, the claw-shaped element 12a is attached to the cab structure 2 by a welded connection. As an alternative, other types of connection can of course be utilized, such as bolt connections, soldered connections and the like.

Figure 3:
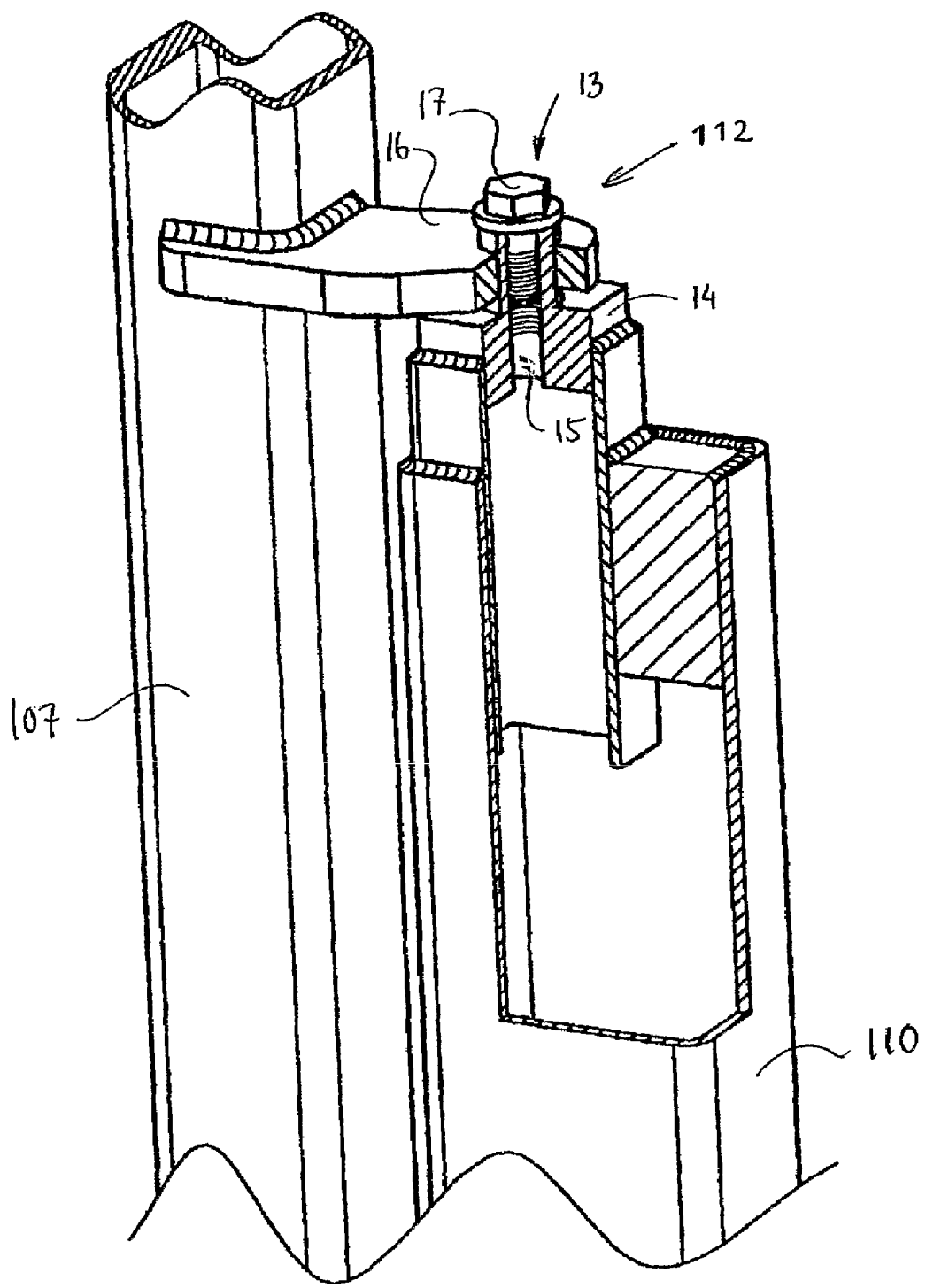
FIG. 3 is a perspective view, shown in partial cutaway, of a second preferred embodiment of the invention.

FIG. 3 shows a second preferred embodiment of the invention. This embodiment is distinguished from the first embodiment described above in connection with FIGS. 1 and 2 by the means 112 for connecting the cab structure 2 and the support structure 3. As shown, the connecting means 112 comprises a screw connection 13. A construction element 14 which is provided with a hole is arranged in the opening in the vertical long construction element 110 of the support structure and is attached to this. In addition, the hole 15 in the construction element 14 is threaded. A plate element 16 which is provided with a hole is attached to the vertical long construction element 107 of the cab structure by a welded connection. The plate element 16 is arranged at a level just above the construction element 14 and provided with a hole in such a way that the holes coincide. A screw 17 is arranged in the hole through the plate element 16 and engages with the threads in the hole 15 in the construction element 14.

In the second embodiment, the support structure can, in addition, be provided with a damping device (not shown) at the bottom of the support structure for damping relative to the frame of the vehicle. In this way, the cab structure and the support structure can be damped individually before sufficient inclination/canting arises for them to be joined to each other mechanically in a force-transmitting way and thereby form a single force-transmitting unit.

The arrangement can, for example, comprise elements for adjusting the position of at least one of the male element and female element of the connecting means in a vertical direction.

The invention is not to be considered to be limited to the embodiments described above; a number of additional variants and modifications being possible within the framework of the following patents claims.

The connecting means 12 can, for example, comprise a pin or a fork-shaped element instead of a claw-shaped element. In the case with the fork-shaped element, it is possible, for example, for the fork-shaped element to project horizontally from the cab structure and to engage with a correspondingly-shaped engagement element that projects vertically from the support structure. It is also appreciated that many variants of this arrangement are possible and which conform with the spirit and limitations of the present invention.

According to an additional example, it is possible for the opening 12b in the connecting means 12 to be provided with a damping element, for example in the form of a rubber element. This damping element will provide a certain damping of the movements of the cab structure and thus act as a supplement to the other damping system 5 for the cab structure. The damping element is, for example, arranged to surround at least partially, and preferably completely, a male element that has been inserted into the opening.

What is claimed is:

1. An arrangement for incorporation in a vehicle cab, said arrangement comprising:
   a cab structure that delimits a driver's working area;
   a support structure;
   a connection means for connecting the cab structure to the support structure in such a way that the support structure supports the cab structure in the event of a considerable inclination of the cab structure relative to horizontal and in the event of an inclination of the cab structure relative to a frame of the incorporating vehicle; and
   said support structure being arranged behind the cab structure with respect to a driving direction of the incorporating vehicle;
   wherein the cab structure and the support structure are arranged to essentially not affect each other in a force-transmitting way when the inclination of the cab structure relative to horizontal and to the frame is less than a predetermined degree of inclination and to be connected in a force-transmitting way when the inclination of the cab structure relative to the horizontal plane and to the frame exceeds said predetermined degree of inclination.

2. The arrangement as recited in claim 1, wherein the support structure extends to a lower height than the height of the cab structure.

3. The arrangement as recited in claim 1, wherein the support structure extends to a height that is less than seventy-five percent of the height of the cab structure.

4. The arrangement as recited in claim 1, wherein the support structure extends to a height that is approximately fifty percent of the height of the cab structure.

5. The arrangement as recited in claim 1, wherein the support structure comprises two devices spaced a distance apart for connecting the support structure to the frame and said support structure is in the shape of an arch that extends between the connecting devices.

6. The arrangement as recited in claim 5, wherein said connecting devices form a means for attaching the support structure to the frame.

7. The arrangement as recited in claim 1, wherein the support structure comprises two upright long support elements arranged at a distance from each other and at least one transverse long support element that connects the two upright long support elements.

8. The arrangement as recited in claim 1, wherein the support structure extends essentially parallel to one side of the cab structure.

9. The arrangement as recited in claim 1, wherein, in an active mode, said connecting means is arranged to provide a force-transmitting connection between the cab structure and the support structure and, in an inactive mode, to afford the cab structure freedom of movement without the transmission of forces from the support structure.

10. The arrangement as recited in claim 1, wherein said connecting means is arranged at an upper part of the support structure.

11. The arrangement as recited in claim 1, wherein said connecting means comprises a male element and a female element, and said male element is attached to the cab structure and the female element is attached to the support structure.

12. The arrangement as recited in claim 11, wherein the female element is arranged in the support structure and comprises an opening which is open at the top to receive the male element in the event of a vertical movement of the cab structure relative to the support structure.

13. The arrangement as recited in claim 1, wherein said connecting means comprises a male element and a female element, and said male element is attached to the support structure and the female element attached to the cab structure.

14. The arrangement as recited in claim 13, wherein the female element is arranged in the support structure and comprises an opening which is open at the top to receive the male element in the event of a vertical movement of the cab structure relative to the support structure.

15. The arrangement as recited in claim 11, wherein the male element consists of a claw-shaped element.

16. The arrangement as recited in claim 12, wherein the male element consists of a claw-shaped element.

17. The arrangement as recited in claim 13, wherein the male element consists of a claw-shaped element.

18. The arrangement as recited in claim 14, wherein the male element consists of a claw-shaped element.

19. The arrangement as recited in claim 1, wherein the cab structure comprises means for damping at least one of shocks and noise from the frame of an incorporating vehicle.

20. An arrangement for incorporation in a vehicle cab, said arrangement comprising:
    a cab structure that delimits a driver's working area;
    a support structure;
    a connection means for connecting the cab structure to the support structure in such a way that the support structure supports the cab structure in the event of a considerable inclination of the cab structure relative to horizontal and in the event of an inclination of the cab structure relative to a frame of the incorporating vehicle; and
    said support structure being arranged behind the cab structure with respect to a driving direction of the incorporating vehicle;
    wherein, in an active mode, said connecting means is arranged to provide a force-transmitting connection between the cab structure and the support structure and, in an inactive mode, to afford the cab structure freedom of movement without the transmission of forces from the support structure.

21. The arrangement as recited in claim 20, wherein the cab structure and the support structure are arranged to essentially not affect each other in a force-transmitting way when the inclination of the cab structure relative to horizontal and to the frame is less than a predetermined degree of inclination and to be connected in a force-transmitting way when the inclination of the cab structure relative to the horizontal plane and to the frame exceeds said predetermined degree of inclination.

22. The arrangement as recited in claim 20, wherein the support structure extends to a lower height than the height of the cab structure.

23. The arrangement as recited in claim 20, wherein the support structure extends to a height that is less than seventy-five percent of the height of the cab structure.

24. The arrangement as recited in claim 20, wherein the support structure extends to a height that is approximately fifty percent of the height of the cab structure.

25. The arrangement as recited in claim 20, wherein the support structure comprises two devices spaced a distance apart for connecting the support structure to the frame and said support structure is in the shape of an arch that extends between the connecting devices.

26. The arrangement as recited in claim 25, wherein said connecting devices form a means for attaching the support structure to the frame.

27. The arrangement as recited in claim 20, wherein the support structure comprises two upright long support elements arranged at a distance from each other and at least one transverse long support element that connects the two upright long support elements.

28. The arrangement as recited in claim 20, wherein the support structure extends essentially parallel to one side of the cab structure.

29. The arrangement as recited in claim 20, wherein said connecting means is arranged at an upper part of the support structure.

30. The arrangement as recited in claim 20, wherein said connecting means comprises a male element and a female element, and said male element is attached to the cab structure and the female element is attached to the support structure.

31. The arrangement as recited in claim 30, wherein the female element is arranged in the support structure and comprises an opening which is open at the top to receive the male element in the event of a vertical movement of the cab structure relative to the support structure.

32. The arrangement as recited in claim 20, wherein said connecting means comprises a male element and a female element, and said male element is attached to the support structure and the female element attached to the cab structure.

33. The arrangement as recited in claim 32, wherein the female element is arranged in the support structure and comprises an opening which is open at the top to receive the male element in the event of a vertical movement of the cab structure relative to the support structure.

34. The arrangement as recited in claim 30, wherein the male element consists of a claw-shaped element.

35. The arrangement as recited in claim 31, wherein the male element consists of a claw-shaped element.

36. The arrangement as recited in claim 32, wherein the male element consists of a claw-shaped element.

37. The arrangement as recited in claim 33, wherein the male element consists of a claw-shaped element.

38. The arrangement as recited in claim 20, wherein the cab structure comprises means for damping at least one of shocks and noise from the frame of an incorporating vehicle.

* * * * *